United States Patent
Mazzanti et al.

(10) Patent No.: US 7,722,799 B2
(45) Date of Patent: *May 25, 2010

(54) METHOD FOR GLAZING CERAMIC ARTICLES OBTAINED BY SLIP-CASTING

(75) Inventors: Vasco Mazzanti, Imola (IT); Alessandro Bernabei, Imola (IT)

(73) Assignee: Sacmi Cooperativa Meccanici Imola Societa' Cooperativa, Imola (IT)

( * ) Notice: Subject to any disclaimer, the term of this patent is extended or adjusted under 35 U.S.C. 154(b) by 272 days.

This patent is subject to a terminal disclaimer.

(21) Appl. No.: 11/938,022

(22) Filed: Nov. 9, 2007

(65) Prior Publication Data

US 2008/0124466 A1 May 29, 2008

Related U.S. Application Data

(63) Continuation of application No. 10/297,760, filed as application No. PCT/EP02/02301 on Feb. 6, 2002, now Pat. No. 7,303,721.

(30) Foreign Application Priority Data

Mar. 9, 2001 (IT) ...................... RE2001A000021

(51) Int. Cl.
*C04B 33/32* (2006.01)

(52) U.S. Cl. ...................... 264/651; 264/637; 264/642; 264/643

(58) Field of Classification Search ................... 264/86, 264/87, 73, 74, 636, 637, 19, 20, 642, 643, 264/651

See application file for complete search history.

(56) References Cited

U.S. PATENT DOCUMENTS

| | | | |
|---|---|---|---|
| 526,669 | A | 9/1894 | McLaughlin |
| 3,689,611 | A | 9/1972 | Hardy et al. |
| 3,832,224 | A | 8/1974 | Brown |
| 4,078,028 | A | 3/1978 | Kishi |
| 4,200,468 | A | 4/1980 | Hurley, Jr. |
| 4,294,635 | A | 10/1981 | Hurley, Jr. |
| 4,720,438 | A | 1/1988 | Watanabe et al. |
| 5,288,443 | A | 2/1994 | Lee |
| 5,514,316 | A | 5/1996 | Kosugi et al. |
| 5,868,993 | A | 2/1999 | Mintchenko et al. |
| 7,303,721 | B2 * | 12/2007 | Mazzanti et al. ............ 264/637 |

FOREIGN PATENT DOCUMENTS

GB 2005567 4/1979

OTHER PUBLICATIONS

Definition of Clay, retrieved from google.com on Jul. 9, 2005.

* cited by examiner

*Primary Examiner*—Carlos Lopez
(74) *Attorney, Agent, or Firm*—Pearne & Gordon LLP

(57) ABSTRACT

Method of glazing ceramic articles, consisting of preparing a glaze compound in liquid suspension, preferably aqueous; feeding the glaze compound in liquid suspension, preferably aqueous, into the forming cavity of a porous mould, for the time required to create a glaze film of desired thickness on the surface of the cavity by absorption of the liquid phase; feeding the slip into the same cavity for the time required to create the wall of the article by absorption of the liquid phase.

8 Claims, No Drawings

METHOD FOR GLAZING CERAMIC ARTICLES OBTAINED BY SLIP-CASTING

This application is a continuation of U.S. patent application Ser. No. 10/297,760, now U.S. Pat. No. 7,303,721, filed Dec. 9, 2002, which is a 35 USC 371 National Phase of PCT/EP02/02301 filed Feb. 26, 2002.

TECHNICAL FIELD

This invention relates to a method for glazing ceramic articles obtained by slip casting within the cavity of a porous mould, and the glaze used in said method.

BACKGROUND ART

This type of ceramic article is glazed either manually or by appropriate robotized machines, after the piece has been formed and dried.

In the case of certain ceramic articles, such as sanitary appliances, the automatic glazing machines are unable to completely glaze all the surfaces of the article, it being possible to glaze only the accessible surfaces, i.e. the visible surfaces.

For example in the case of water closet pans, the rim and the stench trap are currently glazed only on their outer surfaces; likewise it is not possible to glaze the overflow channels of wash-basins and bidets.

Consequently the final product presents unglazed surfaces where, in the course of time, bacterial growth can occur rendering the article unhygienic. Current glazing techniques involve a separate glazing operation which negatively affects the production time and hence cost.

Finally, known glazing machines are costly and complicated.

The object of this invention is to overcome the aforementioned drawbacks of the known art within the context of a rational and reliable solution.

The invention attains said object by virtue of the characteristics defined in the claims.

The invention consists of a method which enables the usual glazing machines to be completely eliminated by glazing the article directly within the forming cavities of the article mould, by injecting into them a glaze compound in liquid suspension, preferably aqueous.

In detail, the method of the invention comprises the following operative steps:
preparing a glaze compound in liquid suspension,
feeding the glaze compound in suspension into the article-forming cavities, for a time sufficient to create a glaze film able to uniformly cover the cavity walls by absorption of the suspension liquid phase;
feeding the slip into the article-forming cavities for a time sufficient to create the article wall by absorption of the slip liquid phase;
possibly feeding the glaze compound into those article-forming cavities in which a film of glaze and a layer of slip have already been deposited, for a time sufficient to create a glaze film able to uniformly cover the inner walls of the layer of slip by absorption of the liquid phase.

The method of the invention can in fact be applied either to the outer and inner surfaces of the article or to only one of the two surfaces, depending on the type of article to be constructed. The method does not require special equipment for its implementation, it using the actual equipment used to form the article.

Said equipment is simply completed by means for feeding and recirculating the liquid glaze suspension, arranged in parallel with the already existing means for feeding and recirculating the slip.

The invention also comprises a glaze suitable for use with the method, which glaze must have characteristics not always present in usual glazes. A suitable glaze must present, during firing, the same chemical and physical characteristics as a usual glaze, whereas during forming and drying it must behave in a manner similar to the layer deposited by the slip.

The co-existence of said characteristics is obtained, according to the invention, by providing in the glaze composition a clay material component which conveniently exceeds 10% and has the function of increasing the plasticity of the glaze and regularizing its shrinkage.

Said clay material can be an illite, kaolinite, chlorite or montmorillonite clay, or a mixture of said clays. Moreover, said clay material component of said glaze is preferably between 15 and 35%.

Three possible glaze compositions suitable for use in this method are given below in the form of tables.

| Raw Materials | GLAZE 1% | GLAZE 2% | GLAZE 3% |
|---|---|---|---|
| Sanblend 90 clay | 20 | | |
| Clay UK1 | | | 20 |
| Kaolin LPC | | 20 | |
| Feldspar F7 | 10 | 9 | |
| K Feldspar FS 900 | | 15 | 23.1 |
| Quartz P4 | 16 | 18 | 13.4 |
| CaSiO$_3$ Vansil EW20 | 13.5 | 16 | 23 |
| ZnO Zinc Oxide | 18 | 1 | |
| Zircobit MO (zirconium silicate) | 1 | 13 | |
| Zircosil 5 (ZrSiO$_4$) | | | 13.5 |
| Barium Carbonate | 6.5 | 6.5 | 5.4 |
| Talc SSB 60 | 1.5 | 1.5 | 1.6 |

If only the outer surface of the article is to be glazed, the glaze suspension in a liquid phase, preferably water, is injected into the mould cavities before forming the article and the liquid phase is then absorbed to create a film of consolidated glaze, of the desired thickness, on the surface of the mould cavity to form the outer surface of the article.

When the film of glaze has been created, the slip is cast in the same mould cavity to form the ceramic article wall, to which said glaze film adheres.

When the article has been removed from the mould, it presents a glazed outer surface.

When the wall of the article has been formed by casting the slip, the inner surface of the article is glazed by injecting the glaze in liquid suspension, preferably aqueous, into the same mould cavity so that a film of consolidated glaze forms adhering to all inner surfaces of the article.

By virtue of the invention, the production of ceramic articles obtained by slip casting is less costly, in that the production plant does not require special glazing machines as glazing is implemented in the actual forming cavities of the mould.

Moreover from the aforegoing, it is apparent that the articles produced using the glazing method of the invention are uniformly glazed in all their parts, both visible and those hidden from the user's view. In certain applications, such as sanitary appliances, it is hygienically very important that the glazing of the article be complete, as this reduces bacterial growth which would render the product unhygienic.

To apply the method of the invention it is sufficient, as described, to provide the mould with two feed circuits, one dedicated to the slip and the other dedicated to the liquid glaze suspension.

The invention claimed is:

1. A method for forming a glazed ceramic article comprising the steps of:
    providing a glaze composition in aqueous liquid suspension, said glaze composition comprising a clay component in aqueous liquid suspension;
    feeding a slip into the cavity of a porous mold to form a wall of the article by absorption of liquid phase of the slip, said article wall having an outer surface and an inner surface;
    feeding the glaze composition in suspension into the forming cavity of the porous mold in which the article wall has already been formed, to create a glaze film that covers the entire inner surface of the article wall by absorption of liquid phase of the glaze composition suspension, said inner surface of the article being hidden from a user's view.

2. The method of claim 1, further comprising a step of recirculating the glaze composition in suspension after feeding the glaze composition in suspension.

3. The method of claim 1, wherein the glaze composition in suspension is fed under pressure to form the glaze film.

4. The method of claim 1, further comprising a step of firing the article to provide said glazed ceramic article.

5. The method of claim 1, wherein said glaze composition comprises from 10 to 60% of clay component.

6. The method of claim 1, wherein the inner surface of the glazed ceramic article is completely glazed.

7. The method of claim 1, wherein said glazed ceramic article is a sanitary appliance.

8. The method of claim 1, wherein said glazed ceramic article is a water closet pan, a wash-basin or a bidet.

* * * * *

UNITED STATES PATENT AND TRADEMARK OFFICE
CERTIFICATE OF CORRECTION

PATENT NO. : 7,722,799 B2  Page 1 of 1
APPLICATION NO. : 11/938022
DATED : May 25, 2010
INVENTOR(S) : Vasco Mazzanti et al.

It is certified that error appears in the above-identified patent and that said Letters Patent is hereby corrected as shown below:

On the cover page, in section (63), please delete "filed as application No. PCT/EP02/02301 on Feb. 6, 2002," and insert --filed as application No. PCT/EP02/02301 on Feb. 26, 2002,--

Signed and Sealed this

Twenty-first Day of September, 2010

David J. Kappos
*Director of the United States Patent and Trademark Office*